US010618214B2

(12) United States Patent
Couderc et al.

(10) Patent No.: US 10,618,214 B2
(45) Date of Patent: Apr. 14, 2020

(54) ARTICLE HAVING A NANOTEXTURED SURFACE WITH HYDROPHOBIC PROPERTIES

(71) Applicants: ESSILOR INTERNATIONAL, Charenton-le-Pont (FR); NIKON CORPORATION, Tokyo (JP)

(72) Inventors: Sandrine Couderc, Tokyo (JP); Grégory Tortissier, Kanagawa (JP)

(73) Assignees: Essilor International, Charenton-le-Pont (FR); Nikon Corporation, Tokyo (JP)

( * ) Notice: Subject to any disclaimer, the term of this patent is extended or adjusted under 35 U.S.C. 154(b) by 0 days.

(21) Appl. No.: 15/751,639

(22) PCT Filed: Aug. 10, 2015

(86) PCT No.: PCT/EP2015/068387
§ 371 (c)(1),
(2) Date: Feb. 9, 2018

(87) PCT Pub. No.: WO2017/025128
PCT Pub. Date: Feb. 16, 2017

(65) Prior Publication Data
US 2018/0229420 A1    Aug. 16, 2018

(51) Int. Cl.
*B29C 59/02* (2006.01)
*B08B 17/06* (2006.01)
(Continued)

(52) U.S. Cl.
CPC ............ *B29C 59/022* (2013.01); *B05D 5/083* (2013.01); *B08B 17/065* (2013.01);
(Continued)

(58) Field of Classification Search
CPC . B29C 59/022; B29C 2059/023; B05D 5/083; B08B 17/065; G02B 27/0006; C08L 83/00; C08L 27/18; B29K 2995/0093
See application file for complete search history.

(56) References Cited

U.S. PATENT DOCUMENTS

2010/0098909 A1\* 4/2010 Reyssat .................. B08B 17/06
428/141
2013/0149496 A1    6/2013 Mazumder et al.
(Continued)

OTHER PUBLICATIONS

International Search Report issued in International Application No. PCT/EP2015/068387, dated Apr. 8, 2016.

*Primary Examiner* — Nathan L Van Sell
(74) *Attorney, Agent, or Firm* — Norton Rose Fulbright US LLP

(57) ABSTRACT

An article having a nanotextured surface with hydrophobic properties, said nanotextured surface comprising an array of pillars (71) defined by a surface fraction (φs) of the pillars, a pitch (P) of the pillars and an aspect ratio (H/2R) of the pillars, wherein: —the surface fraction (s) is equal or greater to 2% and equal or less to 80%; —the pitch (P) is equal or less to 250; —the aspect ratio (H/2R) is equal or less to 2.4, where H is the height of the pillars and R is the radius of the pillars; —the pitch (P), the height (H), the radius (R) are expressed in nanometers (nm); —the nanotextured surface comprises at least partially a hydrophobic material.

29 Claims, 9 Drawing Sheets

(51) Int. Cl.
*G02B 27/00* (2006.01)
*B05D 5/08* (2006.01)
*C08L 27/18* (2006.01)
*C08L 83/00* (2006.01)

(52) U.S. Cl.
CPC .... *G02B 27/0006* (2013.01); *B29C 2059/023* (2013.01); *B29K 2995/0093* (2013.01); *C08L 27/18* (2013.01); *C08L 83/00* (2013.01)

(56) References Cited

U.S. PATENT DOCUMENTS

2013/0323466 A1* 12/2013 Baca ............... B08B 17/065
428/141
2014/0272295 A1 9/2014 Deshpande et al.

* cited by examiner

ARTICLE HAVING A NANOTEXTURED SURFACE WITH HYDROPHOBIC PROPERTIES

CROSS-REFERENCE TO RELATED APPLICATIONS

This application is a national phase application under 35 U.S.C. § 371 of International Application No. PCT/EP2015/068387 filed 10 Aug. 2015, the entire contents of which is specifically incorporated by reference herein without disclaimer.

The invention relates generally to the field of articles having a nanotextured surface with hydrophobic properties. More specifically, it relates to an article where the nanotextured surface comprises an array of pillars. It also relates a method of designing an article having a nanotextured surface with superhydrophobic properties. A surface is superhydrophobic if the static contact angle of water is larger than 150°. Water drops can easily slide on the surface when this one is slightly tilted.

In many applications, notably optics, but not limited to, it is desirable to make articles having a hydrophobic surface to avoid that water drops remain stuck on the article surface and for example to facilitate the cleaning thereof. According to an example and in the case of lenses, notably spectacle glasses, it is common to deposit a hydrophobic coating onto the eyeglass as a final step, to reduce sticking of water drops, for example raindrops on the eyeglass surface, and to make also the eyeglass less sensitive to dirt.

Conventionally, such hydrophobic coatings, notably in the case of antifouling coatings of ophthalmic lenses, comprise fluorinated compounds, such as fluorosilanes and fluorosilazanes.

Generally, a surface is considered as being hydrophobic when having a contact angle with water >90°. Typically, the conventional hydrophobic surfaces have contact angles with water ranging from 90° up to 120°.

It is known that a surface can be made hydrophobic or even more superhydrophobic by creating roughness thereon, such as for example by creating a nanotextured surface. The surface roughness has the effect to trap air inside the structure, a water drop then sitting on a composite surface made of solid and air. This effect, commonly known as "fakir" effect, allows high water static contact angles to be obtained.

Nevertheless articles having a nanotextured surface with hydrophobic properties often have poor mechanical properties.

A problem that the invention aims to solve is to offer articles having a nanotextured surface with hydrophobic properties with good mechanical properties.

For this purpose, an object of the invention is an article having a nanotextured surface with hydrophobic properties, said nanotextured surface comprising an array of pillars defined by a surface fraction ($\phi_s$) of the pillars, a pitch (P) of the pillars and an aspect ratio (H/2R) of the pillars, wherein:
 the surface fraction ($\phi_s$) is equal or greater to 2% and equal or less to 80%;
 the pitch (P) is equal or less to 250;
 the aspect ratio (H/2R) is equal or less to 2.4, where H is the height of the pillars and R is the radius of the pillars;
 the pitch (P), the height (H), the radius (R) of the pillars are expressed in nanometers (nm);
 the nanotextured surface comprises at least partially a hydrophobic material.

Thanks to the present invention, an article having a nanotextured surface is obtained with simultaneously hydrophobic properties and good mechanical properties. The inventors have for example demonstrated that good wiping properties are achieved. Other properties that the nanotextured surfaces might exhibit are good anti-rain performance (meaning that when the nanotextured surface is exposed to real rain conditions, very few amount of residual drops is observed on the surface);
 WSCA (water static contact angle) equal to or higher than the following angles: 130°, 135°, 140°;
 superhydrophobic properties with water static contact angle higher than or equal to 150°;
 oleophobicity regarding oil (especially linoleic acid) with static contact angle upper to 100°;
 self cleaning properties, especially using water bouncing drop effect;
 transparency;
 antireflective effect;

According to an embodiment, the pitch (P) is constant over the nanotextured surface.

According to another embodiment, the pitch varies over the nanotextured surface. The pitch (P) of the pillars has then to be understood as being the average pitch of the pillars as further defined.

According to an embodiment, the radius (R) is constant over the nanotextured surface.

According to another embodiment, the radius varies over the nanotextured surface. The radius (R) of the pillars has then to be understood as being the average radius of the pillars as further defined.

According to an embodiment, the height (H) is constant over the nanotextured surface.

According to another embodiment, the height varies over the nanotextured surface. The height (H) of the pillars has then to be understood as being the average height of the pillars as further defined.

The surface fraction ($\phi_s$) is defined by the total pillar top side surface area determined at a pillar height defined by the entrance opening plane on a reference area divided by the surface of said reference area.

According to an embodiment, the surface fraction ($\phi_s$) is constant over the nanotextured surface.

According to another embodiment, the surface fraction varies over the nanotextured surface. The surface fraction ($\phi_s$) of the pillars has then to be understood as being the average surface fraction of the pillars as further defined.

In the context of the present invention, the expression "nanotextured surface" relates to a surface covered with nano-sized structures. Said nano-sized structures have one dimension on the nanoscale, i.e., between 0.1 and less than 1000 nm (nanometer), preferably between 0.1 and less than 500 nm (nanometer), more preferably between 0.1 and 100 nm. In the present invention, nano-sized structures are pillars.

According to different embodiments of an article of the present invention, that may be combined according to all technically valuable embodiments (Herafter, the pitch (P), the height (H), the radius (R) are expressed in nanometers (nm):
 the top surface of the pillars is flat or extends outward;
 the nanotextured surface has a water receding contact angle (WRCA) equal or greater to 110°, preferably 120°;
 the surface fraction ($\phi_s$) is equal or greater to 10% and/or equal or less to 75%, for example equal or less to 50%;

the aspect ratio (H/2R) is equal or less to 1.7, preferably from 0.2 to 1.7; according to an embodiment, the aspect ratio (H/2R) is equal or less to 0.80, preferably greater to 0.25 and/or equal or less to 0.70;

the pitch (P) is equal or greater to 25;

the pitch (P) is equal or greater to 100, for example equal or greater to 150 and/or equal or less to 230;

the height (H) is equal or greater to 2 and/or equal or less to 600, for example equal or less to 300;

the radius (R) is equal or greater to 10 and/or equal or less to 125, for example equal or less than 100;

the array of pillars is a periodic array, for example is a hexagonal array; the surface energy of the hydrophobic material is equal or less to 20 mJ/m$^2$, for example equal or less to 15 mJ/m$^2$;

the nanotextured surface comprises at least partially a hydrophobic material chosen in the list consisting of:
 a coating of a hydrophobic material deposited on part of the nanotextured surface, for example on the pillar top side part, for example a coating of a fluorinated material layer;
 a coating of a hydrophobic material deposited on whole the nanotextured surface, for example a coating of a fluorinated material layer;
 the material of the nanotextured surface is a hydrophobic material and the nanotextured surface is uncoated, for example a fluorinated material.

the article is a transparent article, for example an optical component, for example a lens; according to an embodiment, the optical component is an ophthalmic lens, as for example a spectacle ophthalmic lens.

The present invention is also directed to a method of designing an article having a nanotextured surface with hydrophobic or superhydrophobic properties, said nanotextured surface comprising at least partially a hydrophobic material and comprising an array of pillars defined by a surface fraction ($\phi_s$) of the pillars, a pitch (P) of the pillars and an aspect ratio (H/2R) of the pillars, where H is the height of the pillars and R is the radius of the pillars and wherein said method comprises following steps:
 choosing the surface fraction ($\phi_s$) so that it is equal or greater to 2% and equal or less to 80%;
 choosing the pitch (P) so that it is equal or less to 250;
 calculating the radius (R) based on the surface fraction ($\phi_s$) and the pitch (P);
 choosing the pillar height (H) so that the aspect ratio (H/2R) is lower than or equal to 2.4;
 the pitch (P), the height (H), the radius (R) are expressed in nanometers (nm).

According to an embodiment of the said method, the method further comprises an additive step of choosing the pillar height (H) so that it is equal or greater to a minimal pillar height ($H_{min}$) wherein $H_{min}$ is chosen within the range $10^{-4}.(P-2R)^2$ to $5.10^{-3}.(P-2R)^2$ and preferably within the range $2.10^{-3}.(P-2R)^2$ to $5.10^{-3}.(P-2R)^2$. The pitch (P), the height (H), the radius (R) are expressed in nanometers (nm).

According to an embodiment of the said method, the method further comprises a step where one chooses a pillar height (H) so that to obtain an anti-reflective nanotextured surface.

The present invention is also directed to an article having a nanotextured surface with hydrophobic or superhydrophobic properties, said nanotextured surface comprising at least partially a hydrophobic material and comprising an array of pillars, defined by a surface fraction ($\phi_s$) of the pillars, a pitch (P) of the pillars and an aspect ratio (H/2R) of the pillars wherein:

$\phi_s$ is chosen equal to or greater than 2% and the pitch (P) and the aspect ratio (H/2R) are chosen such that
 the water receding contact angle (WRCA) on the nanotextured surface is equal or greater to 110° before wiping the article;
 the water receding contact angle (WRCA) on the nanotextured surface remains equal or greater to 110° after wiping the said article at least 600 times.

According to different embodiments of an article of the present invention, that may be combined according to all technically valuable embodiments:
 the nanotextured surface is wiped with a 9 mm diameter flat rod covered by an ophthalmic fabric contacting the nanotextured surface with a 3N normal force that corresponds to a pressure of around 4.7N/cm$^2$ and a linear speed of 2 cm/s;
 the array of pillars are defined by a surface fraction ($\phi_s$) of the pillars, a pitch (P) of the pillars and an aspect ratio (H/2R) of the pillars, wherein:
  the surface fraction ($\phi_s$) is equal or greater to 2% and equal or less to 80%;
  the pitch (P) is equal or less to 250;
  the aspect ratio (H/2R) is equal or less to 2.4, where H is the height of the pillars and R is the radius of the pillars;
  the pitch (P), the height (H), the radius (R) are expressed in nanometers (nm).

Articles according to the present invention may also comprise further feature, where the height (H) is equal or greater to $H_{min}$, wherein $H_{min}$ is chosen within the range $10^{-4}.(P-2R)^2$ to $5.10^{-3}.(P-2R)^2$ and preferably within the range $2.10^{-3}.(P-2R)^2$ to $5.10^{-3}.(P-2R)^2$ and where P is the pitch of the pillars and R is the radius of the pillars. The pitch (P), the height (H), the radius (R) are expressed in nanometers (nm).

Examples will now be described with reference to the accompanying drawings wherein.

Figure 18:
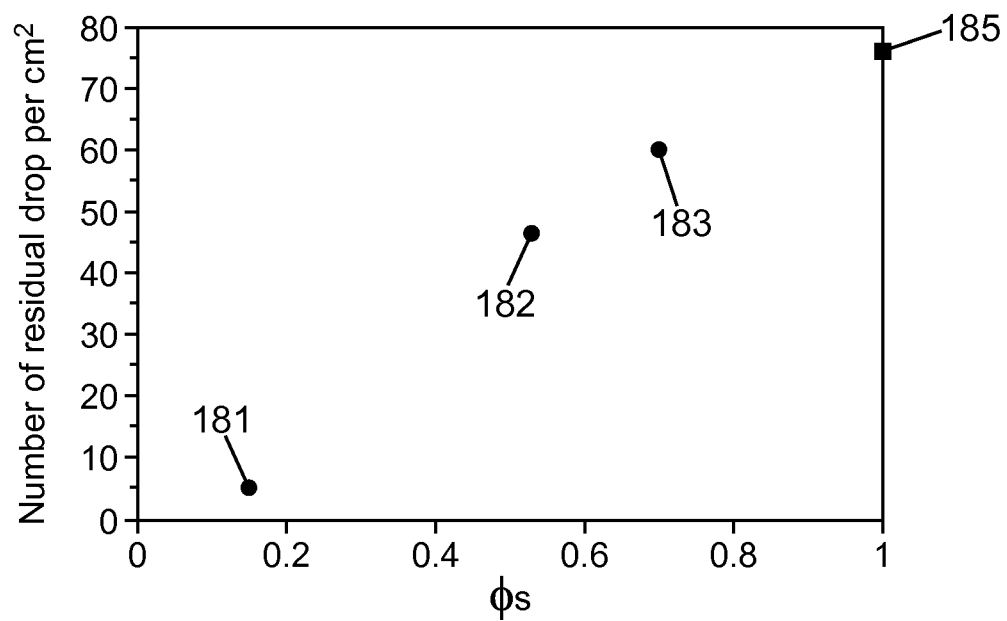

FIG. 18 exhibits measured numbers of rain drop residue per square centimeter on the surface of samples according to the present invention and on the surface of a comparative sample, after being exposed to rain.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

FIGS. 1 to 8 are sketches of nano-sized structures and of article surfaces covered with said nano-sized structures in the frame of the present invention where nano-sized structures are pillars.

The nanostructured surface comprises an arrangement of protrusion features so called pillar structure.

Definitions used in the frame of the present invention are illustrated in view of said figures.

The top-view geometry of the pillar, the sidewall shape, the bottom-side profile, and the spatial arrangement of the structures on the substrate can vary. Different structured surfaces can be formed based on the combination of all these features.

Examples of pillar geometry and spatial arrangement are given in FIGS. 1 to 7.

The topside geometry of the pillar structure can be regularly, irregularly or randomly shaped. Examples of such shape are dawned on FIG. 1 (top side view) and include but are not limited to, circle 11, ellipse 12, square (four identical sides) 13, rectangular (four sides and each two opposite sides are identical) 14, triangular (three sides) 15, cross 16, hexagonal (i.e., six sides) 17, higher order polygons 18, randomly-shaped pillar 19.

The arrangement of the pattern can be a combination of various random or regular or irregular pillar shapes having same or different size, symmetrically, asymmetrically arranged or randomly positioned. It can also be an alternation of random, regular and irregular pillar shapes having symmetrical or random spatial organization or arranged with a combination thereof. Symmetrical spatial arrangements include, but are not limited to, square, hexagonal, octagonal, and staggered. Examples of such spatial organization are dawned on FIG. 2 (top side view) where spatial organizations 21, 23 and 24 are periodical arrangements and spatial organizations 22 and 25 are random arrangements. In spatial organizations 21 and 22, the topside geometry of the pillars is circular; in spatial organization 23, the topside geometry of the pillars is square; in spatial organization 24, the topside geometry of the pillars is rectangular; in spatial organization 25, the topside geometry of the pillars is made of a plurality of forms, such as circles, triangles, squares, rectangles, hexagons. Periodical arrangements are preferred.

The width of the wall side can be constant along its height or it can vary. Thus, the profile of the wall can be straight (perpendicularly oriented to the substrate), oblique, curvy, re-entrant or overhang. Examples of such profiles of the wall are dawned on FIG. 3 (cross section view) where profiles of the wall 31 are cylindrical or columnar, profiles of the wall 32 are conical or tapered and profiles of the wall 33 are either columnar or overhang. Profiles of the wall are can also be pyramidal, prismatic, curved, inverse trapezoidal, or a combination between columnar and rounded. The angle formed between the horizontal plane and the wall side is defined by β and is named the entrance angle. β can vary from 0° up to 115°. The top wall of the pillar can be flat, rounded or sharp.

Figure 1:
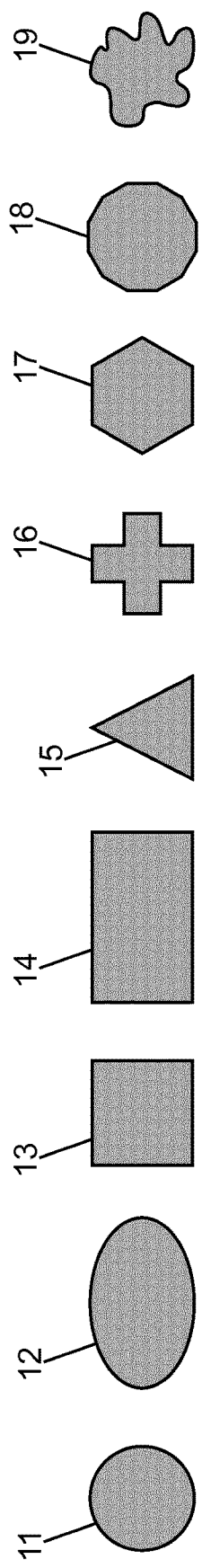
FIGS. 1 to 8 are sketches of nano-sized structures and of article surfaces covered with said nano-sized structures in the frame of the present invention.
Figure 2:
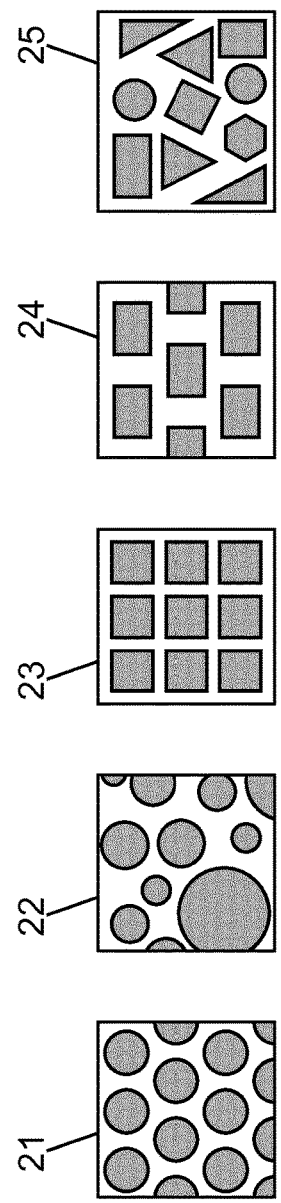
Figure 3:
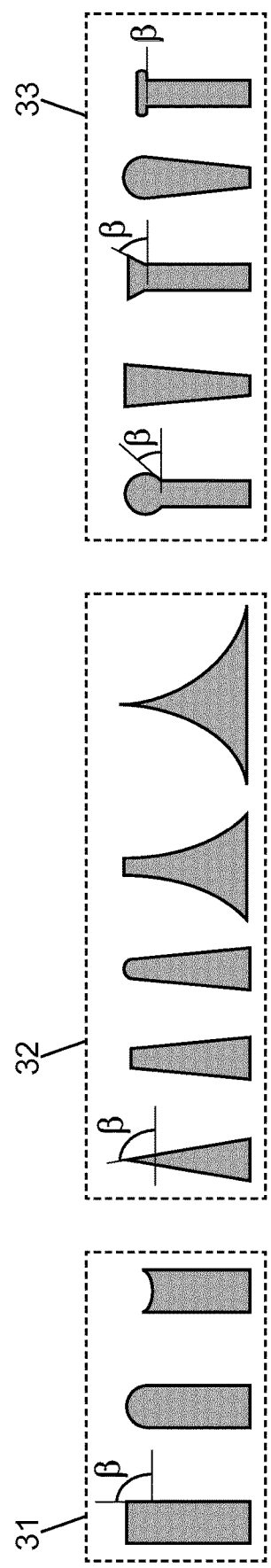
Figure 4:
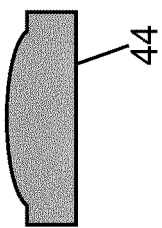
Figure 4:
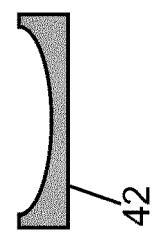
Figure 4:
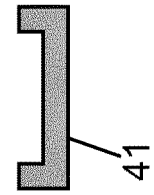

The bottom of structure are illustrated on FIG. 4 (cross section view); the surface between two pillars can be flat-bottomed, see 41, have a surface free of angles such as convex round-bottomed, see 42, or concave round-bottomed, see 44, or cut out in several angles that are less than or equal to 90°, see 43.

Figure 5:
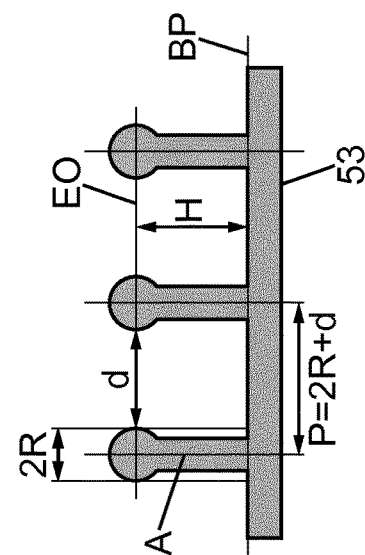
Figure 5:
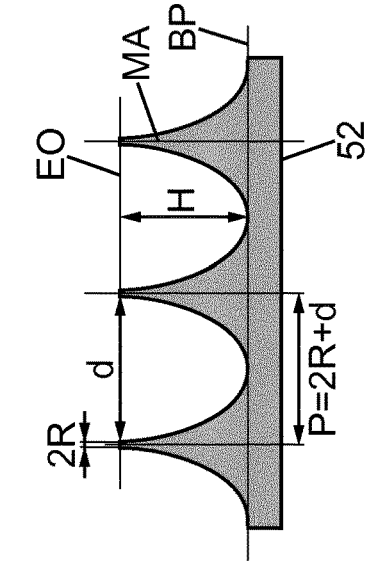
Figure 5:
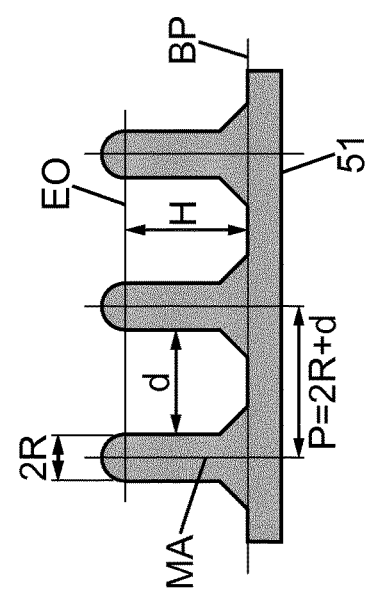

The radius of the pillar structure corresponds to a maximum half-distance between two diametrically opposed points on the pillar top side at the highest position of the cross-section plane defining the pillar entrance opening plane. In the case of half-rounded pillar top-side shape, the entrance opening, EO, corresponds to the cross-section plane just below the rounded apex; in the case of re-entrant or overhang pillar top-side shape (when the entrance angle β is lower than 90°), the entrance opening corresponds to the cross-section plane at the largest width of the cross section view of the wall side shape. In the case of complex pillar top-side geometry, the radius of the pillar refers to an average half-distance value between several combinations of diametrically opposed points on the pillar top side. FIG. 5 (cross section view) shows examples, 51, 52 and 53, of determination of the pillar radius R, the pillar height H, the pillar pitch P, and the interpillar distance d. In embodiments 51, 52 and 53, EO refers to the entrance opening, MA to the main axis, BP to the base plane.

The average radius is the average value of the pillar radius for a set of pillar patterns arranged in an area of 10 µm×10 µm of the structure surface.

The main axis, MA, of the pillar structure is the axis between the center point of the pillar top side on the pillar entrance opening plane, EO, and the center point of the pillar bottom side on the pillar base plane, BP.

The base plane, BP, is defined as a plane orthogonal to the main axis of the pillar and including the lowest point of the surface.

The height of the pillar, H, refers to the highest distance between a point in the cross-section plane defining the entrance opening of the pillar and its normal projection on the base plane of the pillar structure.

The average height is the average value of the heights of the pillar (as defined above) for a set of pillar patterns arranged in an area of 10 µm×10 µm of the structure surface.

The pitch, P of the pillar structure refers to the maximum distance between two points on the main axis of two adjacent pillars in the pillar entrance opening plane.

The average pitch is the average value of the pitches of the pillar for a set of pillar patterns arranged in an area of 10 µm×10 µm of the structure surface.

The interpillar distance, d, of the pillar structure refers to the maximum distance between two points on the face-to-face side wall of two adjacent pillars in the pillar entrance opening plane.

The average interpillar distance is the average value of the interpillar distances of the pillar for a set of pillar patterns arranged in an area of 10 µm×10 µm of the structure surface.

The surface fraction, $\phi_s$, is defined by the total pillar top side surface area determined at a pillar height defined by the entrance opening plane on a reference area divided by said reference surface area. According to an embodiment, the reference surface area is a 10 µm×10 µm surface.

The average surface fraction of the pillars is the average value of the surface fractions of the pillars over the structure surface.

Figure 6A:
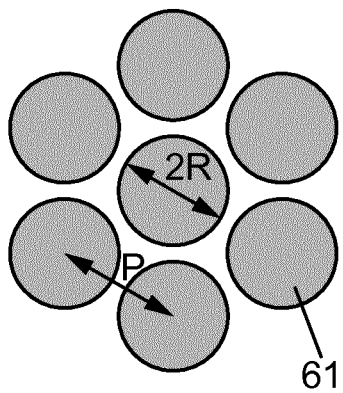

According to an example shown in FIG. 6a (top side view), the nanostructured surface comprises an arrangement of pillars 61 where the pillar spatial arrangement is hexagonal, each pillar section is constant and circular, each pillar diameter is 2R and the pitch P is constant over the nanostructured surface. In said embodiment, surface fraction, $\phi_{sHex}$, is calculated according to following equation:

$$\phi_{sHex} = \frac{2}{\sqrt{3}} \frac{\pi R^2}{P^2}$$

Figure 6B:
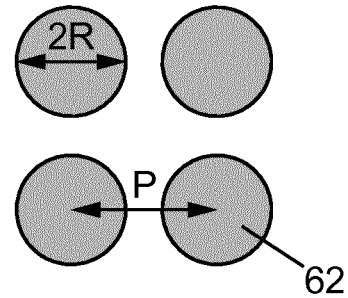

According to an example shown in FIG. 6b (top side view), the nanostructured surface comprises an arrangement of pillars 62 where the pillar spatial arrangement is square, each pillar section is constant and circular, each pillar diameter is 2R and the pitch P is constant over the nanostructured surface. In said embodiment, surface fraction, of $\phi_{sSq}$, is calculated according to following equation:

$$\phi_{sSq} = \frac{\pi R^2}{P^2}$$

Figure 7:
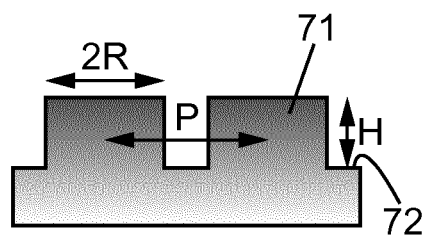

FIG. 7 shows a cross section view of an arrangement of pillars according to FIG. 6a or to FIG. 6b, where a pillar 71 has a constant circular section which diameter is 2R, has a height H from the base plane 72 to the top of the pillar and the pitch is P.

Figure 8:
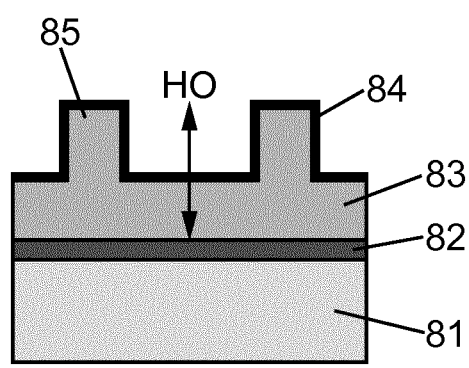

FIG. 8 shows a cross section view of a region of an article according to the invention, where the nanotextured surface comprises an array of pillars 85 and the nanotextured surface is covered by a hydrophobic material layer 84. In said embodiment an adhesion primer layer 82 is deposited on a substrate 81. A resin layer 83 is arranged on the adhesion primer layer 82. Said resin layer has a total height HO and is nanotextured so as to comprise a plurality of pillars 85. According to an embodiment, the total thickness of the resin layer, HO, is about 10 μm.

The nanostructured surface of the article exhibits a surface energy lower than 20 mJ/m², preferably lower than 15 mJ/m², more preferably lower than 14 mJ/m² and better lower than or equal to 12 mJ/m². The nanostructured surface can be made of low surface energy hydrophobic material such as fluorinated resins or fluorinated polymers or it can be coated partially or wholly with a low surface energy coating. In general, such a low surface energy coating comprises at least one of a fluoropolymer or a fluorosilane. Such fluoropolymers or fluorosilanes include, but are not limited to, Teflon® and commercially available fluorosilanes such as Dow Corning 2604, 2624 and 2634; Daikin Optool DSX®, Shinetsu OPTRON®, heptadecafluorosilane (manufactured, for example, by GELEST), FLUOROSYL® (manufactured, for example, by CYTONIX); FAS13, CYTOP™ (from ASAHI) etc. Such coatings can be applied to the nanostructured surface of the article by dipping, vapor coating, spraying, application with a roller, and other suitable method known in the art. Compositions containing fluorosilanes recommended for the preparation of hydrophobic and/or oleophobic top-coats are described in U.S. Pat. No. 6,183,872. They contain fluoropolymers with organic groups carrying silicon-based groups represented by the following general formula and with a molecular weight of $5.10^2$ to $1.10^5$:

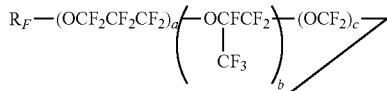

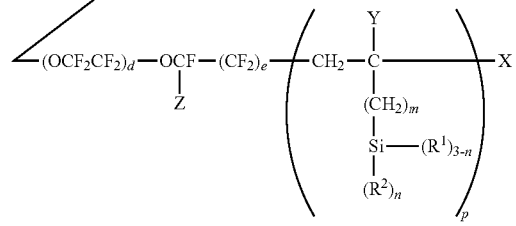

in which $R_F$ represents a perfluoroalkyl group; Z represents a fluoro or trifluoromethyl group; a, b, c, d and e each representing, independently from each other, 0 or an integer greater than or equal to 1, provided that the sum a+b+c+d+e is not less than 1 and that the order of the repeated units between the brackets indexed under a, b, c, d and e are not limited to the one given; Y represents H or an alkyl group comprising from 1 to 4 carbon atoms; X represents an atom of hydrogen, bromine or iodine;

$R^1$ represents an hydroxyl group or a hydrolysable group; $R^2$ represents an atom of hydrogen or a monovalent hydrocarbon group; m represents 0, 1 or 2; n represents 1, 2 or 3; and p represents an integer equal to at least 1, preferably equal to at least 2.

Particularly preferred are perfluoropolyethers of formula:

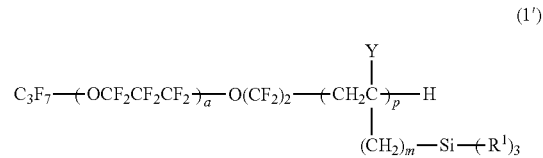

wherein Y, $R^1$, m and p are as defined above and a is an integer from 1 to 50.

A formulation containing a fluorosilane given by the previous formula (1) is marketed by DAIKIN INDUSTRIES with the name OPTOOL DSX®.

The document JP 2005 187936 describes fluorinated compounds of silane suitable for forming anti-smudge coatings and particularly compounds given by the formula:

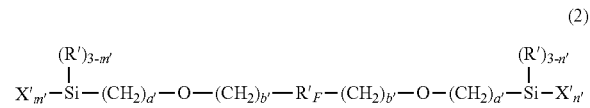

wherein
  $R'_F$ is a linear chain divalent perfluoropolyether radical,
  R' is an alkyl radical in $C_1$-$C_4$ or a phenyl radical,
  X' is a hydrolysable group,
  a' is an integer from 0 to 2,
  b' is an integer from 1 to 5, and
  m' and n' are integers equal to 2 or 3.

A fluorosilane compound given by the formula (2) above is marketed by SHIN-ETSU CHEMICAL CO, Ltd with the name KY-130®.

Fluorosilane compounds given by the formula (2) and methods for preparing them are also described in the patent application EP 1 300 433.

Samples of articles according to the invention have been manufactured where the articles geometry is according to the embodiments of FIGS. 6a, 7 and 8. Those samples have a nanotextured surface with an array of pillars on one sole surface.

In said samples:
- the substrate 81 is a glass slide;
- the adhesion primer layer 82 is made of a primer commercialized under the reference "Ormoprime" from Micro Resist Technology GmbH;
- the resin layer 83 is made of "Ormostamp®" UV-curable resin from Micro Resist Technology GmbH ; said resin layer comprises a nanotextured surface with an array of pillars. Ormostamp resin is an organic/inorganic resin. Other organic/inorganic resins can be used such as any resins in the family of Ormocer® from Micro Resist Technology GmbH (for example Ormocomp®) but also purely organic or inorganic resins.
- the hydrophobic material layer 84 is a fluorinated coating commercialized under the reference "Optool DSX® coating" of Daikin Company.

According to the process of the invention, an article with a nanostructured surface is prepared by NIL (nano imprint lithography) of a substrate using a mold, for example in COP (cycloolefin polymer) material bearing an inverse replica of the pattern shape of the desired nanostructured surface.

The procedure used to make imprinted surface is described in more detail below and comprises the following steps:
- implementing 5 min successive ultrasonic baths of acetone, ethanol and DI water of the substrate;
- drying the surface of the sample with $N_2$ gun;.
- implementing a treatment by Oxygen plasma at 100 W, 14 Pa, 12 sccm for 1 min;
- Spin coating of a primer (Ormoprime™) (optional) and baking at 150° C. for 5 mn;
- Spin coating an Ormostamp® resin and baking at 80° C. for 2 mn
- Contacting the plastic mold (COP material) with the resist film (Ormostamp®, Microresist technology);
- Pressing at 0.2-0.4 MPa (wait few seconds to let the resist fill completely the mold structure);
- UV exposing for around 15 min (UV power is around 3 $mW/cm^2$);
- Stop the UV lamp and the pressure;
- Postbaking of the sample at 80° C. for 1-3 h; Release mold and replica;
- Postbake the resist replica at 150° C. for 1-3 h to harden the structure;
- treating by Oxygen plasma at 50 W, 14 Pa, 12 sccm for 30 s on the replica;
- Dip coating or spin-coating the replica in fluorinated coating to improve repellency (Daikin Optool DSX® at 0.1%);
- 1 h curing at 60° C. and 90% relative humidity;
- Rinsing the replica in fluorinated solvent such as perfluorohexane (or other suitable fluorinated solvents such as Novec 7200 or FC40 from 3m or Sigma—Aldrich) and then with ethanol and DI water;
- Finally drying the sample 30 min on a hotplate at 100° C.

Samples have been manufactured according to a plurality of geometrical features to illustrate embodiments of the present invention.

Figure 9A:
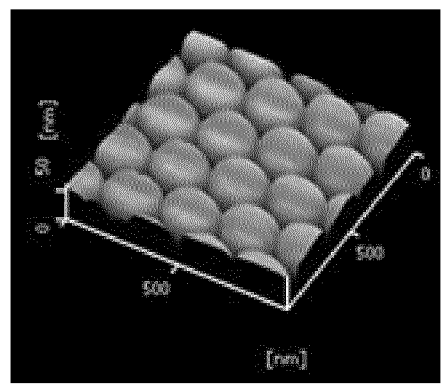
FIGS. 9a to 9c are images of nanotextured surfaces according to the present invention observed by atomic force microscope (AFM).
Figure 9B:
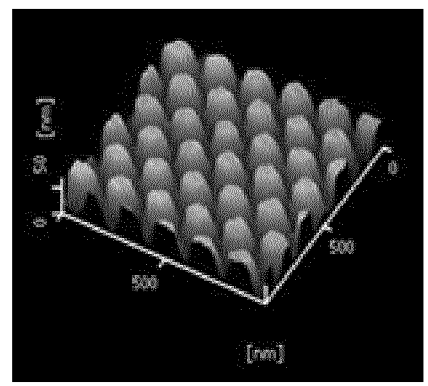
Figure 9C:
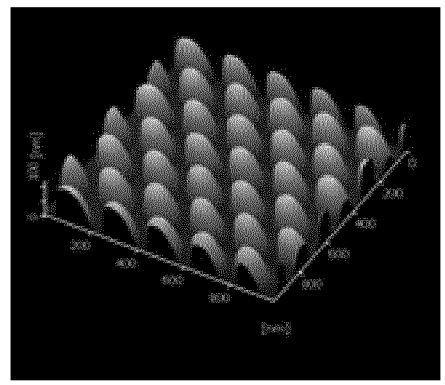

FIGS. 9a to 9c illustrates images of nanotextured surfaces according to the present invention, where said surfaces are observed by an Atomic Force Microscope (AFM); the images correspond to square surface area where the sides are 1 μm length.

Example 1 is illustrated by FIG. 9a, where the surface fraction ($\phi_s$) is constant and equal to 0.7; the pitch (P) is constant and equal 230 nm; the radius (R) is constant and equal to 100 nm; the height (H) is constant and equal to 100 nm; accordingly, the aspect ratio (H/2R) is equal to 0.5.

Example 2 is illustrated by FIG. 9b, where the surface fraction ($\phi_s$) is constant and equal to 0.53; the pitch (P) is constant and equal 170; the radius (R) is constant and equal to 65 nm; the height (H) is constant and equal to 60 nm; accordingly, the aspect ratio (H/2R) is equal to 0.46.

Example 3 is illustrated by FIG. 9c, where the surface fraction ($\phi_s$) is constant and equal to 0.15; the pitch (P) is constant and equal 180 nm; the radius (R) is constant and equal to 35 nm; the height (H) is constant and equal to 105 nm; accordingly, the aspect ratio (H/2R) is equal to 1.5.

Comparative samples have been manufactured according to a comparative example; the samples according to the comparative example comprise a glass slide substrate; an "Ormoprime™" adhesion primer layer on the glass slide substrate; an "Ormostamp®" UV-curable resin layer on the adhesion primer layer; an "Optool DSX® coating on the "Ormostamp®" UV-curable resin layer. In said samples, the "Ormostamp®" UV-curable resin layer is flat and do not comprise a nanotextured surface. Those samples have an "Optool DSX"® coating on one sole surface.

Samples according to Examples 1 to 3 and to the comparative example have been tested to determine their wetting properties.

Figure 10:
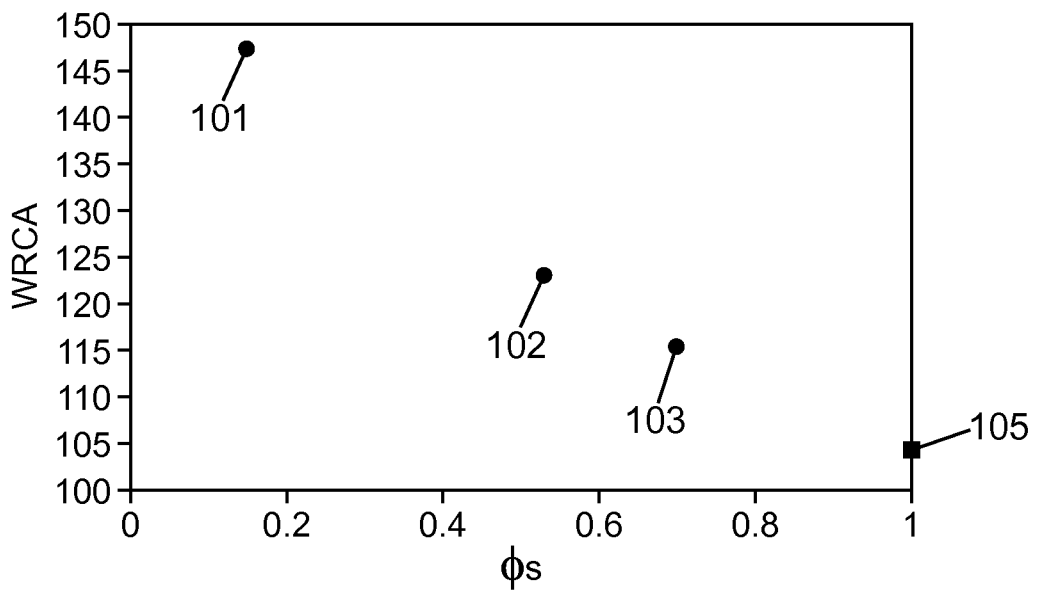
FIGS. 10 and 11 are measured water contact angle data of samples according to the present invention in view of a comparative example.
Figure 11:
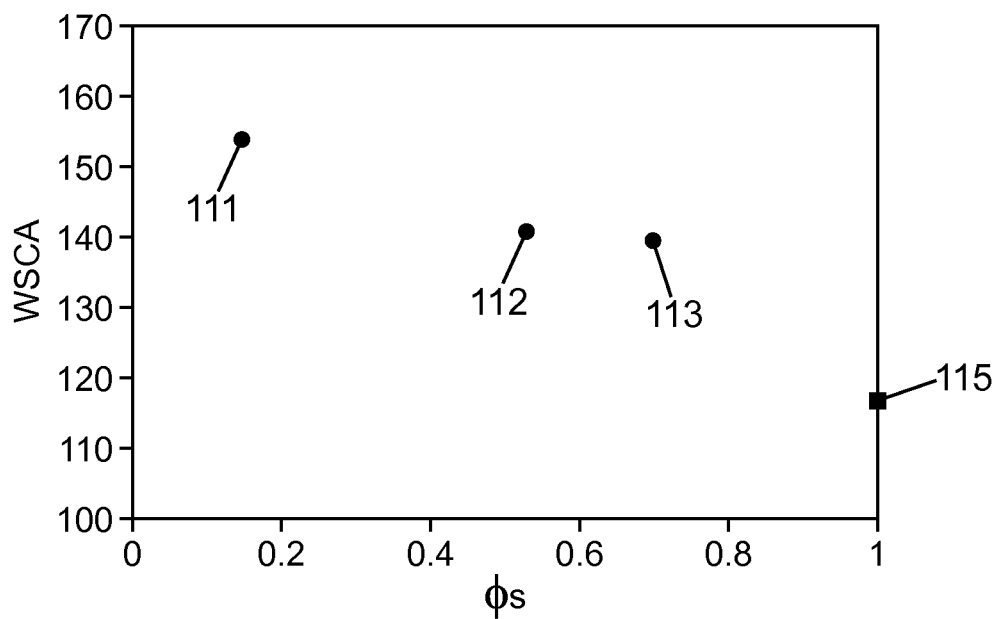

FIG. 10 shows measured water receding contact angle (WRCA) as a function of the surface fraction, of $\phi_s$; FIG. 11 shows measured water static contact angle (WSCA) as a function of the surface fraction, $\phi_s$.

Water static contact angle (WSCA) measurements are made using sessile drop method. It corresponds to the contact angle between the drop and the surface when this one is horizontal. Water is deionized.

Water receding contact angle (WRCA) measurements are made using the "tilted plate" or "inclined plate" method. The tilted plate method captures the contact angle values on both front and rear sides of a sessile drop, here a water drop, while the solid surface to be evaluated is being inclined typically from 0° to 90°. As the surface is inclined, the drop shape is deformed by gravitational effect inducing an increase of the contact angle on the downhill side of the drop and a decrease of the contact angle on the uphill side. Respectively, at the maximum drop deformation just when the drop starts to move, these measured contact angles are referred to advancing and receding contact angles. The tilting angle, from which the drop starts to slide, corresponds to the sliding angle of the surface.

Water receding contact angle (WRCA) measurements have been performed with a "KYOWA DM-500" contact angle-meter used in combination with "FAMAS" interface software which provides an automatic detection of drop and make analysis of drop envelope with different functions: circle, ellipsoid and tangent. Ellipsoid function is used for the water static contact angle measurement while tangent function is used for the water receding contact angle measurements.

For the water static contact angle measurement a water drop of 2 µL is dispensed in once (a 32 gauge needle is used) on the surface. For the water receding contact angle measurement, a water drop having a volume drop of 20 µL is dispensed in once (a needle of 1.3 mm outer diameter −18 gauge needle) on the surface. The liquid density is 1 g/cm$^3$.

Conditions for measuring the sliding angle are the following ones:
- continuous tilting method (where sample surface inclination angle varies from 0° to 90°)
- detection of the sliding angle is done before the sliding of the drop;
- the sliding angle is detected when both front and rear angle contact points move of a distance equal of or over than 200 µm;
- both advancing and receding contact angle are measured;
- waiting time before starting measurement is 2 s;
- If the surface is curved, the software provides an option for automatically detecting the surface curvature or manually adding it.

Measurements can be done on convex or concave surfaces. For concave surfaces, it is possible to edge the article, especially if the article is a lens, and keep only the central part of the article for the measurements.

Data numeral references 101, 111 refer to Example 3; Data numeral references 102, 112 refer to Example 2; Data numeral references 103, 113 refer to Example 1; Data numeral references 105, 115 refer to the comparative example.

Measured water receding contact angle (WRCA) is 147° and measured water static contact angle (WSCA) is 154° for Example 3.

Measured water receding contact angle (WRCA) is 123° and measured water static contact angle (WSCA) is 141° for Example 2.

Measured water receding contact angle (WRCA) is 115° and measured water static contact angle (WSCA) is 140° for Example 1.

Measured water receding contact angle (WRCA) is 104° and measured water static contact angle (WSCA) is 117° for the comparative example.

The present results clearly demonstrate that wetting properties of Examples according to the invention are significantly enhanced when compared to wetting properties of the comparative example.

The repellency for water increases when the surface fraction, $\phi_s$, decreases. For samples according to the invention, the water receding contact angle increases substantially linearly as a function of the decrease of surface fraction, $\phi_s$.

Samples according to Examples 1 to 3 and to the comparative example have been tested to determine their optical properties.

Figure 12:
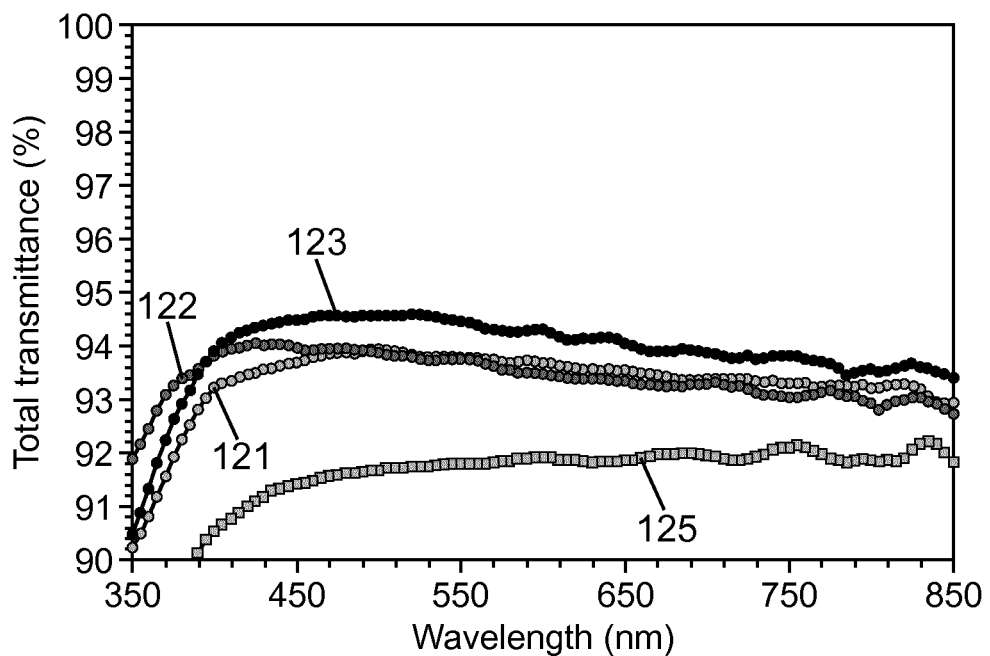
FIGS. 12 and 13 are measured optical data of samples according to the present invention in view of a comparative example.
Figure 13:
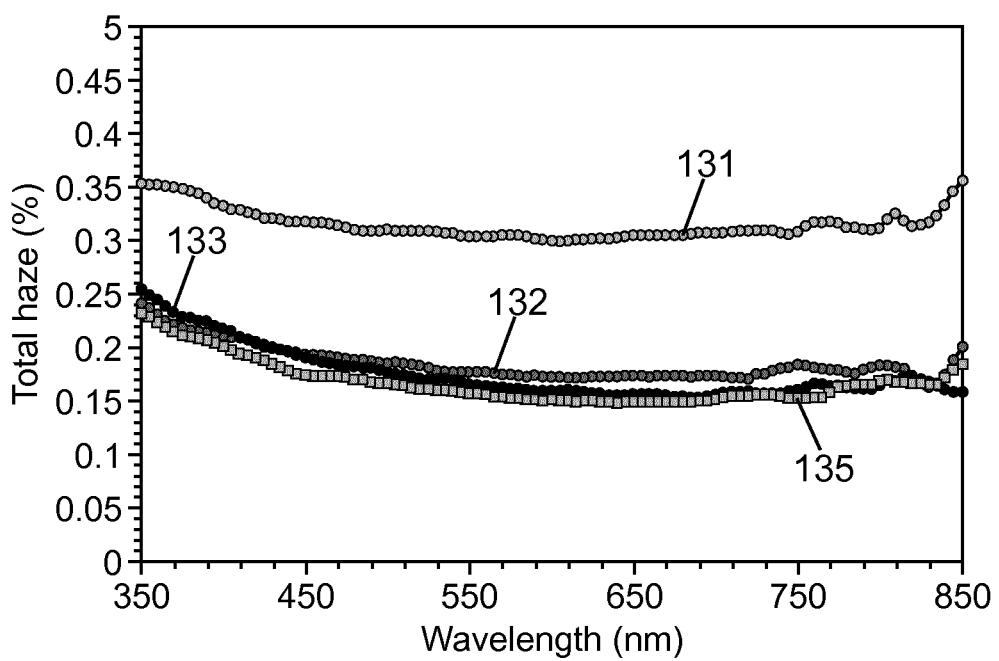

FIG. 12 shows the total transmittance (in %) of samples as a function of the wavelength (in nm); FIG. 13 shows the total haze (in %) of samples as a function of the wavelength (in nm). Optical properties measurements have been made by using a spectrophotometer. For nanotextured surface, only one side of the surface is covered with nanopatterns.

Curves references 121, 131 refer to Example 3; Curves references 122, 132 refer to Example 2; Curves references 123, 133 refer to Example 1; Curves references 125, 135 refer to the comparative example.

Samples according to the present invention exhibit total transmittance which is superior to 93.5% on all the visible range and their total transmittance is significantly enhanced compared to samples according to the comparative example. Those results demonstrate that an anti-reflective effect is advantageously reached for embodiments according to the present invention. Furthermore, samples according to the present invention exhibit haze lower than 0.5% and even lower than 0.35% on all the visible range (400-700 nm).

In order to study mechanical behaviour of the samples, wiping tests have been performed.

Wiping tests have been performed by using a tribometer instrument which applies wiping laps on a surface. The experimental set-up is composed of an arm on which a flat rod is fixed. The flat rod has a 9 mm in diameter and is covered with Toray ophthalmic fabric, Toraysee™ MC1919H-G9 (composed of polyester microfibers weaved regularly and homogeneously). A normal 3 N force is applied. These conditions are close to real wiping conditions for cleaning ophthalmic lens with a fabric. The mode of the tribometer is reciprocating with a linear speed of 2 cm/s and a length of 2 cm. A lap is defined by a two ways wiping step. The distribution of the pressure is equal to 4.7 N/cm$^2$.

Evolution of wetting and optical properties are measured as a function of wiping laps number, the density of scratch per unit area is evaluated (through microscope observation) and observation are made by AFM to identify possible damaged areas. Said properties are measured after 100 laps and 300 laps (after each measurement, the ophthalmic fabric is changed).

Figure 14:
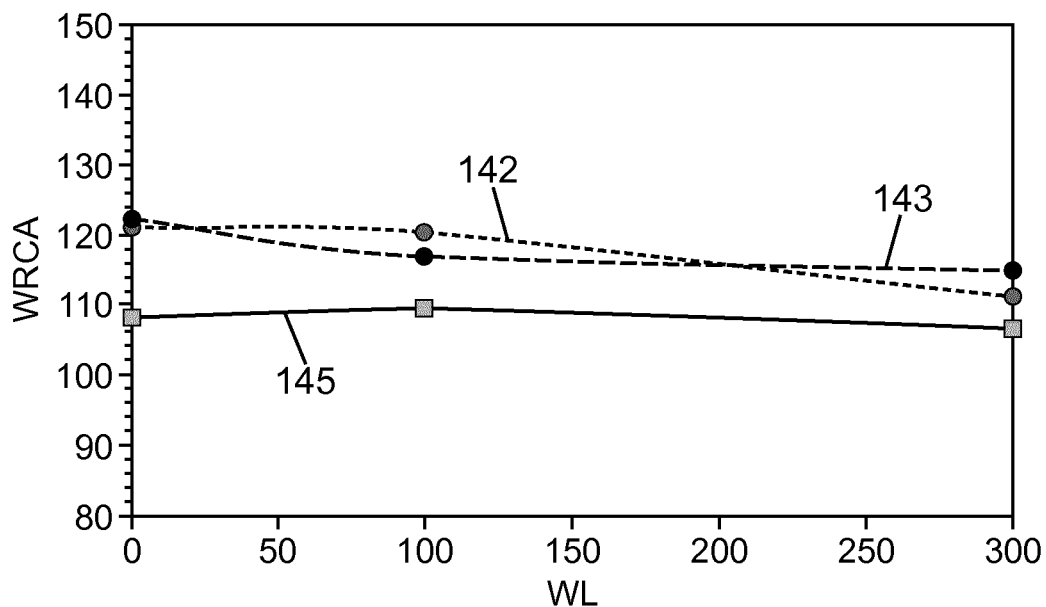
FIGS. 14 and 15 are measured water contact angle data of samples according to the present invention in view of a comparative example when applying wiping tests.
Figure 15:
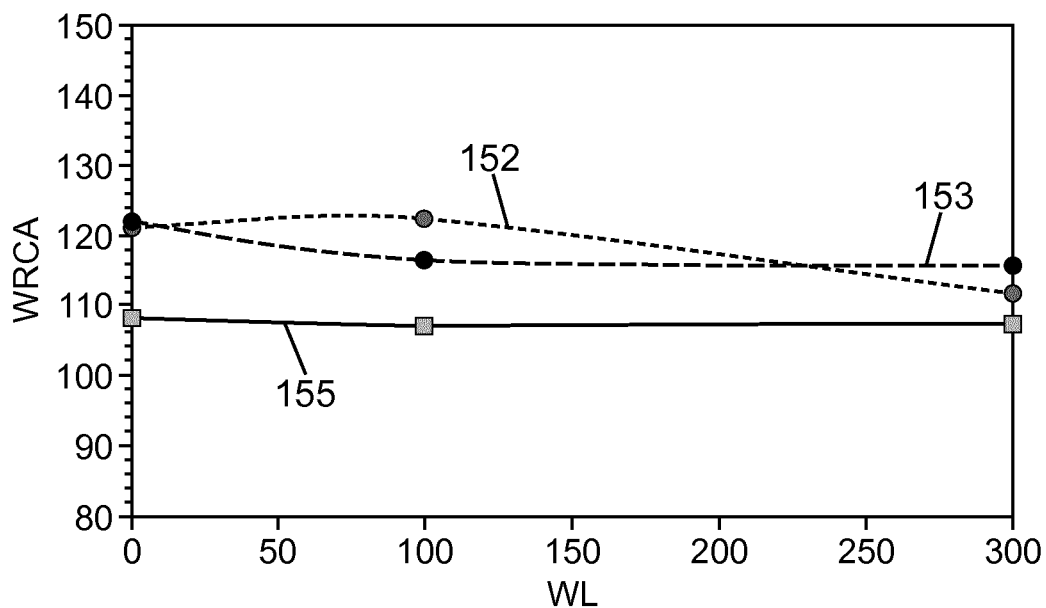

FIGS. 14 and 15 show the measured water receding contact angle (WRCA expressed in degrees) of samples as a function of wiping laps number (WL). In FIG. 14, the water receding contact angle (WRCA) is measured parallel to the wiping direction and in FIG. 15, it is measured perpendicular to the wiping direction.

Curves references 142, 152 refer to Example 2; Curves references 143, 153 refer to Example 1; Curves references 145, 155 refer to the comparative example.

Those data demonstrate that wetting properties of samples according to the invention remain excellent after performing wiping tests.

It has also been demonstrated that optical properties of samples according to the invention remain excellent after performing wiping tests.

In general, samples according to the present invention exhibit haze lower than 0.5% and even lower than 0.35% on all the visible range (400-700 nm) after the wiping test described above.

Measurements can be done with a Hitachi spectrophotometer U-4100 using an integrated sphere.

It has thus been demonstrated that samples according to the present invention have a nanotextured surface with hydrophobic properties where good mechanical properties are reached.

Accordingly, the present invention is also directed to an article having a nanotextured surface with hydrophobic, preferably superhydrophobic properties, said nanotextured surface comprising at least partially a hydrophobic material and comprising an array of pillars, defined by a surface fraction ($\phi_s$) of the pillars, a pitch (P) of the pillars and an aspect ratio (H/2R) of the pillars wherein:

$\phi_s$ is chosen equal to or greater than 2% and
the pitch (P) and the aspect ratio (H/2R) are chosen such that
- the water receding contact angle (WRCA) on the nanotextured surface is equal or greater to 110° before wiping the article;
- the water receding contact angle (WRCA) on the nanotextured surface remains equal or greater to 110° after wiping the said article at least 600 times (i.e. at least 300 laps).

Based on here above results and on calculations made by the inventors, conditions have been drawn to define a method of designing an article having a nanotextured surface with hydrophobic, preferably superhydrophobic properties, said nanotextured surface comprising at least partially a hydrophobic material and comprising an array of pillars:
  choosing the surface fraction ($\phi_s$) so that it is equal or greater to 2% and equal or less to 80%;
  choosing the pitch (P) so that it is equal or less to 250;
  calculating the radius (R) based on the surface fraction ($\phi_s$) and the pitch (P); said radius is calculated so as the surface covered by circles having said radius and arranged with a pitch (P) is the same surface as the actual pillar total surface;
  choosing the pillar height (H) so that the aspect ratio (H/2R) is lower than or equal to 2.4.

Further calculations have been drawn by the inventors in order to take into account complementary parameters that are directed to various kinds of rain conditions. Those calculations help studying how an article having a nanotextured surface with hydrophobic properties according to the present invention can advantageously ensure water drop bouncing properties for various kinds of rain conditions. Depending on the type of applications, the target type of rain can range from moderate rain conditions, meaning drop velocity is about 6 m/s, to very heavy rain conditions such as those of typhoon or thunderstorm where drop velocity ranges from 7.5 m/s to 9.2 m/s.

In order to prevent partial infiltration of water drop when this one hits the surface, the Laplace pressure should exceed the drop impact pressures meaning the water hammer pressure $P_{WH}$ and the Bernoulli pressure $P_B$.

Figure 16A:
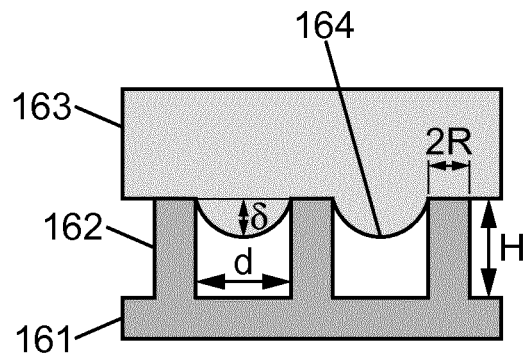
FIGS. 16a and 16b are sketches of the interaction behaviors of a water drop with a nanotextured surface.
Figure 16B:
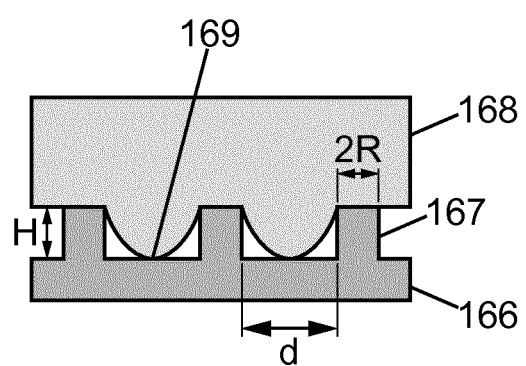

FIGS. 16a and 16b show schematics of scenarios for water drop impacting different pillar textured surfaces, where substrates are respectively referred as 161, 166; pillars are respectively referred as 162, 167; water drops are respectively referred as 163, 168; water drop bottoms are respectively referred as 164, 169. In FIG. 16a, the height of the pillar is enough to ensure complete recoil of water drop. In FIG. 6b, the height of the pillar is not enough and the center part of the drop contacts the bottom of the pillars; a partial pinning is then expected.

At the very first moment of the drop impacts and creates a shock wave which is due to sudden reduction of drop velocity; it causes rise of the pressure inside the drop so called water hammer pressure, $P_{WH}$, where:

$$P_{WH} = 0.2 \rho C V$$

Where $\rho$ is the water density ($\rho=10^3 kg/m^3$); C is the speed of sound in water (C=1482 m/s); V is the velocity (m/s) of the drop when this one impacts the surface.

After this early impact, the pressure drops to Bernoulli pressure, $P_B$, given by:

$$P_B = \frac{\rho V^2}{2}$$

The water hammer pressure is significantly higher than Bernoulli pressure. To promote the complete recoil (total rebound) of droplet and avoid partial or total penetration of water inside the nanotextured surface, the Laplace pressure $P_L$ should exceed both water hammer and Bernoulli pressures as follow:
  $P_L < P_B < P_{WH}$: complete infiltration
  $P_B < P_L < P_{WH}$: partial pinning
  $P_B < P_{WH} < P_L$: complete recoil In order to satisfy the complete recoil condition for specific rain conditions (having drop velocity V), the Laplace pressure $P_L$ should exceed water hammer pressure $P_{WH}$:

$$P_L = \frac{8\gamma\delta\cos^2\theta_{Adv}}{d^2(1-\sin\theta_{Adv})} > P_{WH}$$

Where d is the largest interpillar distance (diagonal for square arrangement).
$\theta_{Adv}$: advancing contact angle of water on smooth surface (for example Ormostamp® resin coated with Optool DSX® coating)
$\gamma$: liquid surface tension (for water $\gamma=72 \ 10^{-3}$ N/m).
$\delta$: drop meniscus height (defined in FIG. 16a)

This relation implies a condition on pillar height meaning that the minimum pillar, $H_{min}$, for avoiding the meniscus to touch the bottom the structure is expressed by the relation:

$$H_{min} = \frac{0.2\rho C V d^2 (1-\sin\theta_{Adv})}{8\gamma\cos^2\theta_{Adv}}$$

The most critical case is obtained for the largest meniscus curvature meaning $\theta_{Adv}=180°$. So the $H_{min}$ expression becomes:

$$H_{min} = \frac{0.2\rho C V d^2}{8\gamma}$$

Calculations have been made to respectively define the pillar height (H) for a given solid fraction and a given pitch value (P) (meaning a given interpillar distance d) so as complete recoil can be achieved for drop exhibiting velocity equal or lower than 9.2 m/s and 6 m/s respectively. In a simplified form, $H_{min}$ in nanometer can be expressed as following:

$$H_{min}(nm) \approx \frac{0.001 V(m/s) \cdot d^2(nm^2)}{2}$$

For V=6 m/s:

$$H_{min} (nm) \approx 0.003 \ d^2 \ (nm^2)$$

and for V=9.2 m/s:

$$H_{min} (nm) \approx 0.0046 \ d^2 \ (nm^2)$$

Based on those results one can define a pillar minimal pillar height, $H_{min}$, that gives an advantageous threshold as far as rain conditions are concerned and where:
$H_{min}$ is chosen within the range $10^{-4}.(P-2R)^2$ to $5.10^{-3}.(P-2R)^2$ and preferably within the range $2.10^{-3}.(P-2R)^2$ to $5.10^{-3}.(P-2R)^2$. The pitch (P), the height (H), the radius (R) are expressed in nanometers (nm).

The anti-rain performances on nanotextured surfaces were demonstrated by exposing to real rain conditions the nanotextured samples and comparative sample under same inclination angle (30°). After 20 mn exposure under light rain conditions (corresponding to rain drop velocity V~[3-4] m/s), a photograph of the surface was taken and the number of residual drop per square centimeter was extracted from image treatment. FIG. 18 shows the number of residual drops per square centimeter as a function of surface fraction ($\phi_s$) for three nanotextured samples having surface fractions of 0.15, 0.53 and 0.7 respectively and the comparative sample. Data numeral reference 181 refers to Example 3; Data numeral reference 182 refers to Example 2; Data numeral reference 183 refers to Example 1; Data numeral reference 185 refers to the comparative sample. All nanotextured sample show less residual drop than the comparative sample.

Figure 17:
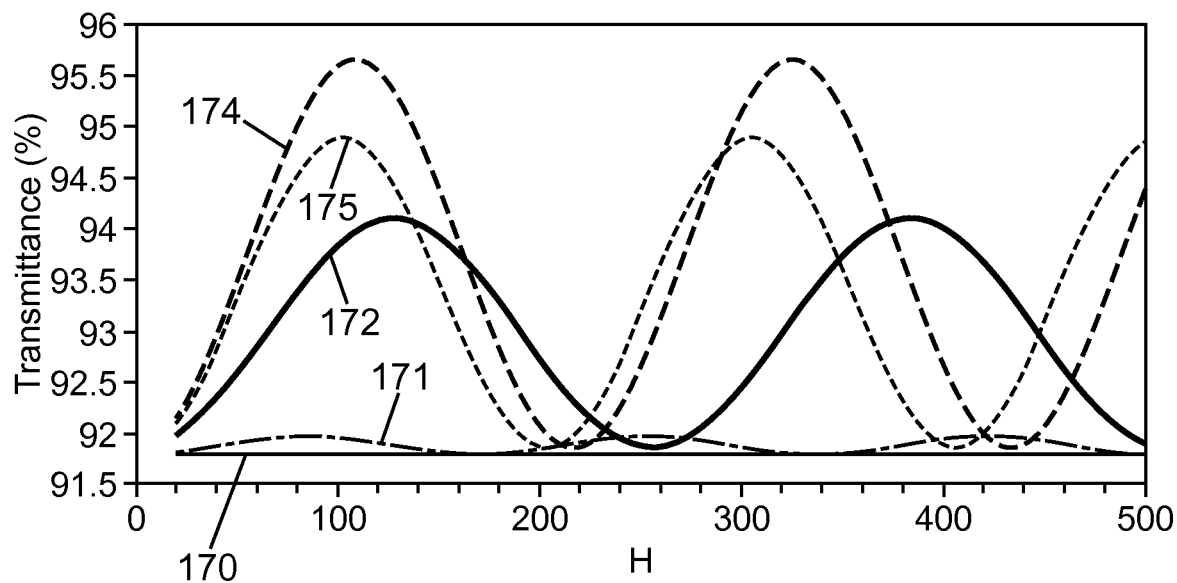
FIG. 17 represent calculated transmittance values as a function of pillar height (H) of several articles with nanostructure surfaces having different surface fractions ($\phi_s$) according to the present invention.

Further calculations have been made by the inventors to study the influence of pillars height as far as transmittance is concerned. FIG. 17 shows the results of said calculations where numeral reference 170 refer to a comparative example with no pillar, and numeral references 171, 172, 174, 175 refer to examples with nano-pillars which surface fraction ($\phi_s$) is respectively 0.02, 0.15, 0.53, 0.7. Calculated transmittance (in %) is plotted as a function of pillar height (in nm) for said different embodiments.

Said results demonstrate that embodiments with pillar heights comprised between about 50 nm and about 150 nm are particularly interesting because they show excellent antireflective properties.

The invention has been described above with the aid of embodiments without limitation of the general inventive concept; in particular the parameters are not limited to the examples discussed.

The invention claimed is:

1. An article comprising a nanotextured surface with hydrophobic properties, said nanotextured surface comprising an array of pillars defined by a surface fraction ($\phi_s$) of the pillars, a pitch (P) of the pillars and an aspect ratio (H/2R) of the pillars, wherein:
    the surface fraction ($\phi_s$) is equal to or greater than 2% and equal to or less than 80%;
    the pitch (P) is equal to or less than 250;
    the aspect ratio (H/2R) is greater than 0.25 and/or equal to or less than 0.70, where H is the height of the pillars and R is the radius of the pillars;
    the pitch (P), the height (H), the radius (R) of the pillars are expressed in nanometers (nm);
    the nanotextured surface comprises at least partially a hydrophobic material.

2. The article of claim 1, wherein the top surface of the pillars is flat or extends outward.

3. The article of claim 2, wherein the nanotextured surface has a water receding contact angle (WRCA) equal to or greater than 120°.

4. The article of claim 1, wherein the nanotextured surface has a water receding contact angle (WRCA) equal to or greater than 110°.

5. The article of claim 1, wherein the surface fraction ($\phi_s$) is equal to or greater than 10% and/or equal to or less than 75%.

6. The article of claim 5, wherein the surface fraction ($\phi_s$) is equal to or less than 50%.

7. The article of claim 1, wherein the aspect ratio (H/2R) is equal to or less than 0.80.

8. The article of claim 1, wherein the pitch (P) is equal to or greater than 25.

9. The article of claim 8, wherein the pitch (P) is equal to or greater than 100.

10. The article of claim 9, wherein the pitch (P) is equal to or greater than 150 and/or equal to or less than 230.

11. The article of claim 1, wherein the height (H) is equal to or greater than 2 and/or equal to or less than 600.

12. The article of claim 11, wherein the height (H) is equal to or less than 300.

13. The article of claim 1, wherein the radius (R) is equal to or greater than 10 and/or equal to or less than 125.

14. The article of claim 13, wherein the radius (R) is equal or less than 100.

15. The article of claim 1, wherein the array of pillars is a periodic array.

16. The article of claim 15, wherein the array of pillars is a hexagonal array.

17. The article of claim 1, wherein the surface energy of the hydrophobic material is equal to or less than 20 mJ/m².

18. The article of claim 17, wherein the surface energy of the hydrophobic material is equal to or less than 15 mJ/m².

19. The article of claim 1, wherein the nanotextured surface comprises at least partially a hydrophobic material chosen from the list consisting of:
    a coating of a hydrophobic material deposited on part of the nanotextured surface;
    a coating of a hydrophobic material deposited on whole the nanotextured surface;
    the material of the nanotextured surface is a hydrophobic material and the nanotextured surface is uncoated.

20. The article of claim 19, wherein the nanotextured surface comprises at least partially the hydrophobic material chosen in the list consisting of:
    a coating of a hydrophobic material deposited on part of the nanotextured surface, on the pillar top side part, being a coating of a fluorinated material layer;
    a coating of a hydrophobic material deposited on whole the nanotextured surface, being a coating of a fluorinated material layer;
    the material of the nanotextured surface is a hydrophobic material and the nanotextured surface is uncoated, being a fluorinated material.

21. The article of claim 1, wherein said article is a transparent article.

22. The article of claim 21, wherein said article is an optical component.

23. The article of claim 22, wherein said article is a lens.

24. The article of claim 1, wherein the height (H) is equal to or greater than $H_{min}$, wherein $H_{min}$ is chosen within the range $10^{-4} \cdot (P-2R)^2$ to $5 \cdot 10^{-3} \cdot (P-2R)^2$ and where P is the pitch of the pillars and R is the radius of the pillars, expressed in nanometers (nm).

25. A method of designing an article of claim 1 having a nanotextured surface with hydrophobic properties, said nanotextured surface comprising at least partially a hydrophobic material and comprising an array of pillars defined by a surface fraction ($\phi_s$) of the pillars, a pitch (P) of the pillars and an aspect ratio (H/2R) of the pillars, where H is the height of the pillars and R is the radius of the pillars and wherein said method comprises following steps:
    choosing the surface fraction ($\phi_s$) so that it is equal to or greater than 2% and equal to or less than 80%;
    choosing the pitch (P) so that it is equal to or less than 250;
    calculating the radius (R) based on the surface fraction ($\phi_s$) and the pitch (P);
    choosing the pillar height (H) so that the aspect ratio (H/2R) is greater than 0.25 and/or equal to or less than 0.70; and
    the pitch (P), the height (H), the radius (R) of the pillars are expressed in nanometers (nm).

26. The method of claim 25, wherein said method further comprises an additive step of choosing the pillar height (H) so that it is equal to or greater than a minimal pillar height ($H_{min}$) wherein $H_{min}$ is chosen within the range $10^{-4} \cdot (P-2R)^2$ to $5 \cdot 10^{-3} \cdot (P-2R)^2$, the pitch (P), the height (H), the radius (R) being expressed in nanometers (nm).

27. The method of claim 26, wherein $H_{min}$ is chosen within the range $2 \cdot 10^{-3} \cdot (P-2R)^2$ to $5 \cdot 10^{-3} \cdot (P-2R)^2$.

28. The method of claim 25, wherein said method further comprises a step where:
choosing the pillar height (H) to obtain an anti-reflective nanotextured surface.

29. An article comprising a nanotextured surface with hydrophobic properties, said nanotextured surface comprising an array of pillars defined by a surface fraction ($\phi_s$) of the pillars, a pitch (P) of the pillars and an aspect ratio (H/2R) of the pillars, wherein:
the surface fraction ($\phi_s$) is equal to or greater than 2% and equal to or less than 80%;
the pitch (P) is equal to or less than 250;
the aspect ratio (H/2R) is equal to or less than 0.8, where H is the height of the pillars and R is the radius of the pillars;
the pitch (P), the height (H), the radius (R) of the pillars are expressed in nanometers (nm); and
the nanotextured surface comprises at least partially a hydrophobic material.

* * * * *